(12) United States Patent
Ramires et al.

(10) Patent No.: US 11,078,339 B2
(45) Date of Patent: Aug. 3, 2021

(54) PROCESS FOR OBTAINING THERMOPLASTIC COMPOSITE PELLETS REINFORCED WITH CELLULOSE PULP AND ADDITIVE CELLULOSE PULP

(71) Applicants: FIBRIA CELULOSE S.A., São Paulo (BR); SERVIÇO NACIONAL DE APRENDIZAGEM INDUSTRIAL—SENAI, Porto Alegre (BR)

(72) Inventors: Elaine Cristina Ramires, São José dos Campos (BR); Marcelo Rodrigues Da Silva, Pindamonhangaba (BR); Cristiane Miotto Becker, Porto Alegre (BR); André Luís dos Santos Da Silva, Porto Alegre (BR); Vinícius Oliveira, Canoas (BR)

(73) Assignees: SERVIÇO NACIONAL DE APRENDIZAGEM INDUSTRIAL—SENAI; SUZANO S.A.

( * ) Notice: Subject to any disclaimer, the term of this patent is extended or adjusted under 35 U.S.C. 154(b) by 0 days.

(21) Appl. No.: 16/349,954

(22) PCT Filed: Nov. 16, 2017

(86) PCT No.: PCT/BR2017/050344
§ 371 (c)(1),
(2) Date: May 14, 2019

(87) PCT Pub. No.: WO2018/090117
PCT Pub. Date: May 24, 2018

(65) Prior Publication Data
US 2019/0300660 A1  Oct. 3, 2019

Related U.S. Application Data

(60) Provisional application No. 62/423,743, filed on Nov. 17, 2016.

(51) Int. Cl.
| | | |
|---|---|---|
| *C08J 5/04* | (2006.01) |
| *C08J 3/12* | (2006.01) |
| *C08J 3/22* | (2006.01) |
| *C08L 1/02* | (2006.01) |
| *C08L 23/06* | (2006.01) |
| *C08L 23/12* | (2006.01) |
| *C08L 23/10* | (2006.01) |
| *C08K 5/00* | (2006.01) |
| *C08J 3/20* | (2006.01) |
| *C08K 5/09* | (2006.01) |
| *C08K 5/092* | (2006.01) |

(52) U.S. Cl.
CPC ............ *C08J 5/045* (2013.01); *C08J 3/12* (2013.01); *C08J 3/201* (2013.01); *C08J 3/226* (2013.01); *C08K 5/00* (2013.01); *C08K 5/092* (2013.01); *C08L 1/02* (2013.01); *C08L 23/06* (2013.01); *C08L 23/10* (2013.01); *C08L 23/12* (2013.01); *C08J 2323/06* (2013.01); *C08J 2323/12* (2013.01); *C08J 2423/06* (2013.01); *C08J 2423/12* (2013.01)

(58) Field of Classification Search
CPC ..... C08J 5/045; C08J 3/12; C08J 3/226; C08J 3/201; C08J 2323/06; C08J 2323/12; C08J 2423/06; C08J 2423/12; C08L 1/02; C08L 23/06; C08L 23/12; C08L 23/10; C08K 5/00; C08K 5/092
USPC .......................................................... 523/351
See application file for complete search history.

(56) References Cited

U.S. PATENT DOCUMENTS

| | | | | |
|---|---|---|---|---|
| 8,455,574 B2 * | 6/2013 | Dean | ......... | C08L 23/02 524/13 |
| 2005/0187315 A1 * | 8/2005 | Dean | ......... | C08L 23/02 524/17 |
| 2008/0261019 A1 * | 10/2008 | Shen | ......... | C08J 9/0085 428/317.5 |

FOREIGN PATENT DOCUMENTS

| | | | |
|---|---|---|---|
| CN | 105295175 A | * | 2/2016 |
| CN | 105694230 A | * | 6/2016 |

OTHER PUBLICATIONS

D.O. Castro, A. Ruvolo-Filho, E. Frollini, "Materials prepared from biopolyethylene and curaua fibers: Composites from biomass", Polymer Testing 31 (Oct. 31, 2012) 880-888 (Year: 2012).*

D.O. Castro et al. "Materials prepared from biopolyethylene and curaua fibers: Composites from biomass", Polymer Testing, 31, pp. 880-888 (Year: 2012).*

* cited by examiner

*Primary Examiner* — Michael Bernshteyn
(74) *Attorney, Agent, or Firm* — Morrison & Foerster LLP

(57) ABSTRACT

The present invention refers to a process for obtaining thermoplastic composite pellets reinforced with cellulose pulp or additive cellulose pulp, cellulose fibers, and/or hydrophilic material from renewable source, and/or natural source material comprising the steps of cellulose pulp dry processing carried out in a binder mill, and/or plastic agglomerator and/or densifier, and preparation of the masterbach comprising the steps of drying the pulp and the thermoplastic materials, preparing the compositions of polymer and cellulose fiber, milling the masterbatch produced, drying the product, extruding the polymer and the masterbatch, and injecting the obtained material.

7 Claims, 8 Drawing Sheets

PROCESS FOR OBTAINING THERMOPLASTIC COMPOSITE PELLETS REINFORCED WITH CELLULOSE PULP AND ADDITIVE CELLULOSE PULP

CROSS-REFERENCE TO RELATED APPLICATIONS

This application is a U.S. National Phase under 35 U.S.C. § 371 of International Application No. PCT/BR2017/050344, filed Nov. 16, 2017, which claims priority to U.S. Provisional Application No. 62/423,743, filed Nov. 17, 2016, the disclosure of each of which is hereby incorporated herein by reference in its entirety.

FIELD OF THE INVENTION

The present invention refers to the field of cellulosic pulp or fibers and additive cellulose pulp processing and, in particular, to the process for obtaining thermoplastic composite pellets reinforced with cellulose pulp and additive cellulose pulp, and/or hydrophilic material from renewable source, and/or natural source material.

BACKGROUND OF THE INVENTION

Several lignocellulosic materials are used as fillers or reinforcement in thermoplastic composites, and such materials have become important as fillers or reinforcements in polymer or ceramic matrices due to their advantages in relation to other inorganic or synthetic materials. Likewise, reinforced polymer composites with tailored properties could replace conventional materials such as metals, plastics and wood in many application scopes, such as the building, automotive, furniture, and aerospace industries.

Some of the inherent advantages of cellulosic fibers are listed as follows: they have low density, they are obtained from renewable source, they exhibit low abrasion to machinery; they have the same performance for lower weight and are stronger (25-30%) for the same weight; they have lower processing energy requirements and a low thermal expansion coefficient; they have good mechanical properties, besides being low cost, which represents a very attractive factor. For these reasons, cellulose-based composites have found construction applications and automotive ones, among others.

SUMMARY OF THE INVENTION

It is an object of the present invention to provide a process for obtaining thermoplastic composite pellets reinforced with cellulose pulp and additive cellulose pulp comprising the steps of:

a) cellulose pulp or fiber dry processing carried out in a binder mill and/or plastic agglomerator and/or densifier;

b) preparation of the masterbach comprising the steps of:

b. 1) preparing the compositions at about 10/90 to 90/10ratio of polymer and cellulose pulp, in a mixing chamber, at a temperature range from about 90 to about 300° C.;

b. 2) milling the masterbatch produced; and b. 3) extruding the polymer and the masterbatch, in a ratio of 10/90 to 90/10, using two gravimetric feeders, one for each product, in an extruder, with speeds ranging from 10 to 400rpm and temperatures from about 90 to about 300° C.;

wherein, in the preparation of the compositions, the polymer can be firstly added into the chamber, and after it is completely melt, the cellulose fiber or pulp is gradually added thereinto.

BRIEF DESCRIPTION OF DRAWINGS

The structure and operation of the present invention, together with further advantages thereof may be better understood by reference to the accompanying drawings and the following descriptions.

DETAILED DESCRIPTION OF THE INVENTION

Figure 1:
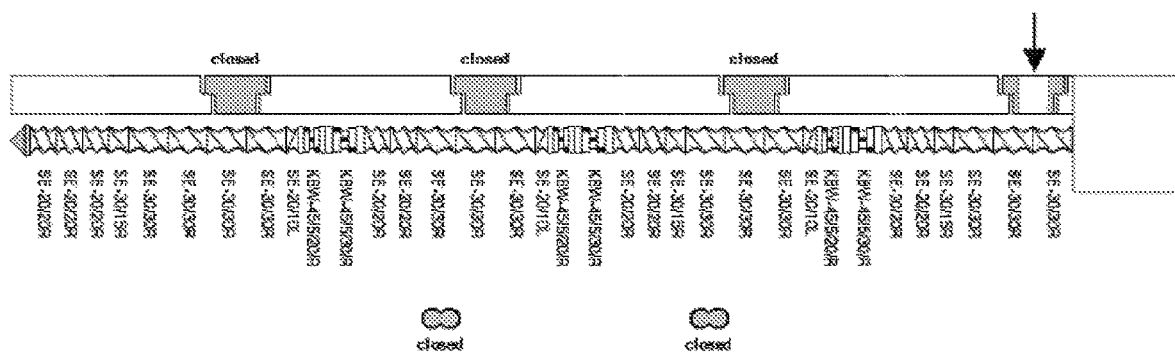
FIG. 1 illustrates the twin screw profile selected by the type of material.

Although the present invention may be susceptible to various embodiments, there are shown in the drawings and in the following detailed discussion, preferred embodiments with the understanding that the present disclosure is to be considered as an exemplification of the principles of the invention and is not intended to limit the present invention to what is illustrated and described herein.

The preferred embodiment of this invention relates to a process for obtaining thermoplastic composite pellets reinforced with cellulose pulp, and/or hydrophilic material from renewable source, and/or natural source material, wherein the steps of the process are detailed as follows:

a) Cellulose Pulp or additive cellulose pulp processing

The pulp processing comprises the grinding of the cellulose pulp, it being carried out in a binder mill, a plastic agglomerator and/or densifier or simply known by plastic binder.

This mill is typically used for recycling plastic films. The binder consists of a tube, where an electric motor provides power for rotating an axle with knives within this tube, in order to shear the material and heat it by friction with its own knives and the walls of the equipment. In some mills, there are also blades on the walls of the tube.

In the case of cellulose pulp, as it is not a thermoplastic material, the material does not melt inside the binder. The grinding time of the cellulose pulp leaves is controlled by the ammeter present in the binder engine. The ammeter shows low and constant values when the leaf turns into pulp.

b) Masterbatch Preparation

In some cases, before the production of the masterbatch, the leaves and the thermoplastic materials were dried for 1 to 48 hours, at 30 to 100° C., so as to remove moisture from the material.

Compositions were prepared at 10/90 to 90/10 ratio of polymer and cellulose pulp in a Haake torque rheometer coupled to a mixing chamber, using roller type rotors. The mixing chamber is commonly used to prepare mixtures and compounds in pilot scale for elastomers, thermoplastics and composites.

The temperature range used for preparing the masterbatches in the mixing chamber was from about 90 to about 300° C. The speed of stirring employed was of about 80 rpm. Initially, the polymer is added into the chamber, and after the material is completely melt, the cellulose fiber is added in steps, in line with the torque variation to achieve clarity of dispersion and homogeneity of the mixture.

In an optional embodiment of the invention, at least one compatibilizer can be used for preparing the masterbatch, wherein the at least one compatibilizer is selected from the group consisting of maleic anhydride and additives such as lignin, nanocellulose, and the like.

The masterbatches produced were milled into a knife mill. In relation to the grinding time, in an industrial mill, from about 10 to about 50 Kg/h of the masterbatch can be ground. It is worth mentioning that this production capacity is directly related to the mill size.

After milling, the material was again dried in an oven, under the same conditions previously used.

For the extrusion process, two gravimetric feeders were used to feed the polymer and the masterbatch in the extruder, with speeds ranging from 10 to 400 rpm, and temperatures between 90 to about 300° C. The compositions 90/10 presented a large production volume and a constant process throughout the extrusion. The compositions 70/30 provided a constant process, but the production was lower compared to the 90/10 compositions.

In some tests, the pigmentation of composites was possible, by means of the addition of at least one pigment for preparing the masterbatch.

EXAMPLES

Processability Tests

The equipment used to incorporate fiber into the polymers was a torque rheometer (Brabender) with a double screw extruder module attached. The twin screw profile illustrated in FIG. 1 was selected by the type of material.

The temperature profile used was 185 éC to 210 éC (hopper-array).

For all processes, the materials were dried in an oven for 24 h at 70 éC to remove the moisture before processing.

Example 1—Feeding and Incorporation Tests 1.1 Incorporation using Feeders

Fiber embedding tests via side feeder were carried out, using addition hoppers in the third heating zone, a gravimetric feeder in the third heating zone and embedding into the hopper with the resin:

Fiber incorporation through the side feeder: This process was unsuccessful since the density of the cellulose pulp is very low in comparison with the polymer. The side feeder does not have enough force to push the pulp into the extruder.

Fiber incorporation through the addition hopper in the third heating zone of the extruder: This process was unsuccessful, for the same reasons given with the embedding of the fiber using the side feeder. The fiber feed by gravity was hindered, and the feeding needed to be forced into the hopper.

Fiber incorporation using a gravimetric feeder in the third heating zone of the extruder: This process was unsuccessful, since the feeder does not have enough force to push the fibers towards the hopper. The feeder failed to keep the constant dosage rate.

Figure 2:
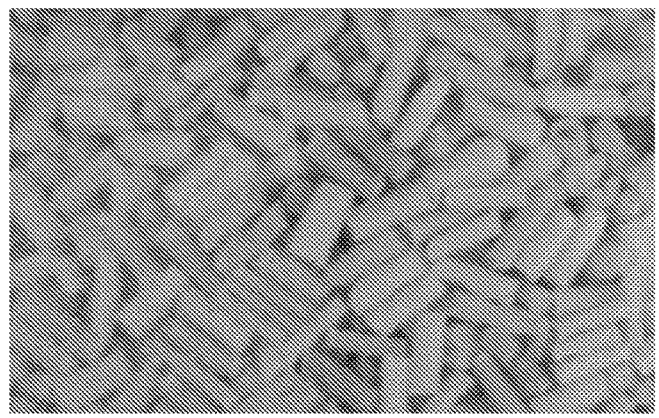
FIG. 2 shows PP pellets with 10% fiber, produced via force feeding of fiber and polymer.

Fiber incorporation in the first hopper along with the polymer (forced feeding): In this process, due to the different densities between the polymer and the fiber, only the polymer is fed by gravity into the extruder. The manual addition of both components was tried, forcing the polymer and fiber feeding into the hopper. With this, it was possible to process the materials, however, as the feed is manual and forced, the accurate control of the polymer and fiber content during the process was not achieved. According to the feed, the extruded matter presented more or less fiber content, which can be observed by the color differences between the pellets (FIG. 2). In this case, even using low thread rotation (50 rpm) of the extruder, the extrusion process was not constant.

From the results obtained in the first processing tests, it was found that the reprocessing of pellets produced via force feeding to obtain a better homogeneity of the material is necessary. Furthermore, the use of the masterbatch (concentrated) should be evaluated to obtain a more homogeneous material and with better control of fiber/polymer fraction.

1.2 Reprocessing tests—Reprocessing of composites made from force feeding of polymer and fiber into the addition hopper in the first extruder heating zone The pellets obtained in the force feeding process (shown in FIG. 2) were reprocessed again in the extruder. To reprocess these composites, the process has become a bit more stable than the initial processing; however, it was not possible to maintain the process constant, and it was not possible to use the shredder automatically. The addition was carried out using the gravimetric feeder without force feeding. Even so, problems related to the extruder feeding were found, and the feeder had to be stopped in process steps. The extruded matter was cooled in the channel and shredded later.

The processing speed in the extruder was 80 rpm to the bleached cellulosic pulp and 200 rpm to the unbleached fiber. The feeder was adjusted to a rate of 1.5 Kg/h.

Figure 3:
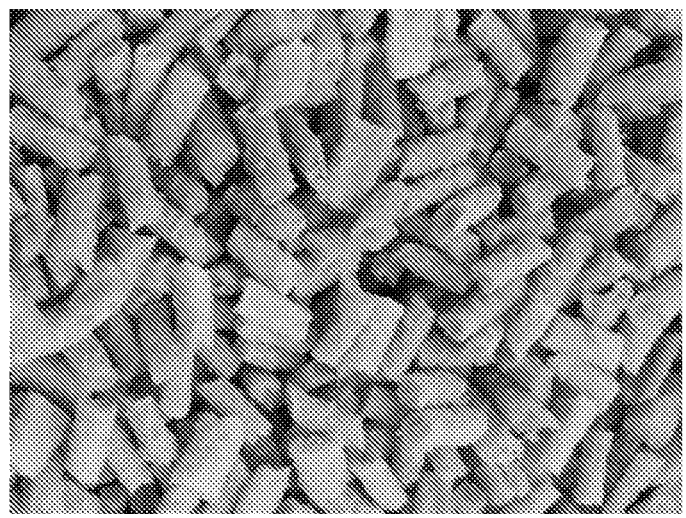
FIG. 3 shows PP pellets with 10% of fiber after reprocessing.

FIG. 3 shows a picture of PP pellets with 10% of fiber after reprocessing. In comparison with FIG. 2, it can be observed a better homogeneity of the material.

Example 2—Masterbatch Use 2.1 Formulation of Masterbatch in a Mixing Chamber

In order to overcome all extruder feeding problems, (concentrated or pre-dispersed) masterbatches were manufactured comprised by polyolefins and fibers, in a Haake type torque rheometer by using the coupled mixing chamber module.

The masterbatches were prepared at 50/50 ratio by mass, then, they were milled in a knife mill. The material obtained has an adequate density for extruder feeding.

Figure 4:
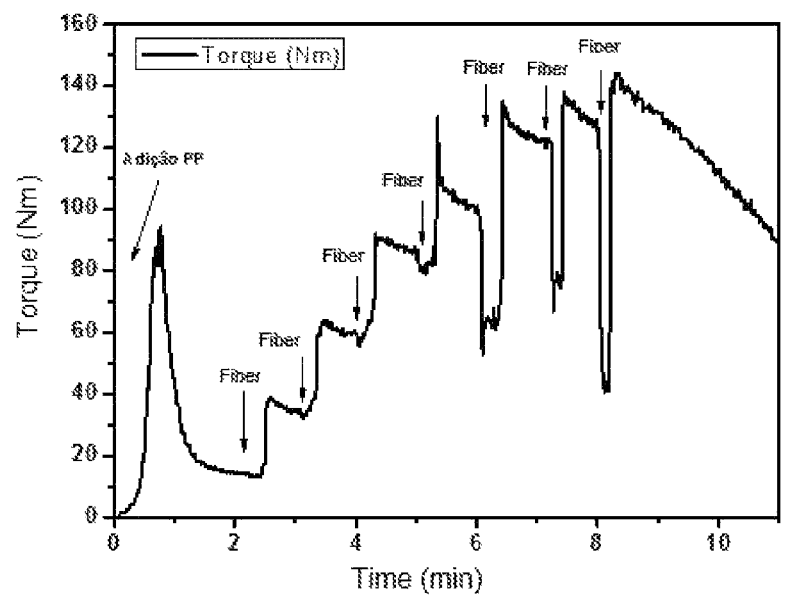
FIG. 4 shows the "fingerprint" of the masterbatch manufacturing process in the mixing chamber.

The "fingerprint" of the masterbatch manufacturing process is presented in FIG. 4. At the beginning of the process, PP is added in the mixing chamber, being mixed up to the complete thermoplastic fusion, which is verified by the torque decrease and stabilization. From 2 minutes of the process, they are added stepwise to the cellulose fibers. The mixing process was finished between 10 and 12 minutes.

The masterbatch formulations can be found in Tables 1 and 2 below.

TABLE 1

Masterbatch PP + fibers Formulation

| Ingredients | Amounts, phr | Density, g/cm$^3$ | Volume, cm$^3$ | Amounts to be weighted, in grams |
|---|---|---|---|---|
| Polypropylene | 50.00 | 0.91 | 55.25 | 131.2 |
| Cellulose embedded fiber | 50.00 | 1.50 | 33.33 | 131.2 |
| Total | 100.00 | — | 88.58 | 262.5 |

Compound density, g/cm$^3$ 1.129
Free chamber volume, cm$^3$ 310
Chamber filling factor 0.75
Volume to be produced, cm$^3$ 232.50
mass to be produced, in grams 262.47
Rotation speed, rpm 80
Initial temperature of the mixture, in éC 190

Figure 5:
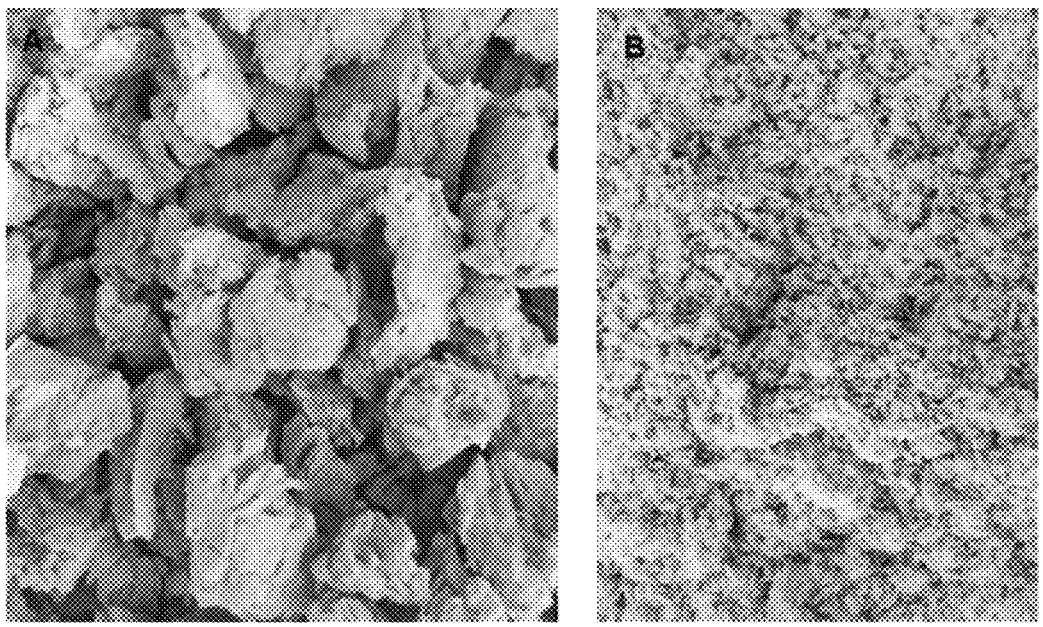
FIG. 5 illustrates the masterbatch of 50/50 PP/cellulose pulp after incorporation in the mixing chamber (A) and after being milled (B).

FIG. 5 shows the masterbatch of PP/fiber just after being processed in the mixing chamber and after being milled.

TABLE 2

Master - PE + Fiber Formulation

| Ingredients | Amounts, phr | Density, g/cm3 | Volume, cm3 | Amounts to be weighted, in grams |
|---|---|---|---|---|
| polyethylene | 50.00 | 0.96 | 52.36 | 135.7 |
| Cellulose | 50.00 | 1.50 | 33.33 | 135.7 |
| Total | 100.00 | — | 85.69 | 271.3 |

Compound density, g/cm$^3$ 1.1167
Free chamber volume, cm$^3$ 310
Chamber filling factor 0.75
Volume to be produced, cm$^3$ 232.50
Mass to be produced, in grams 271.33
Rotation speed, rpm 80
Initial temperature of the mixture, in éC 190

Figure 6:
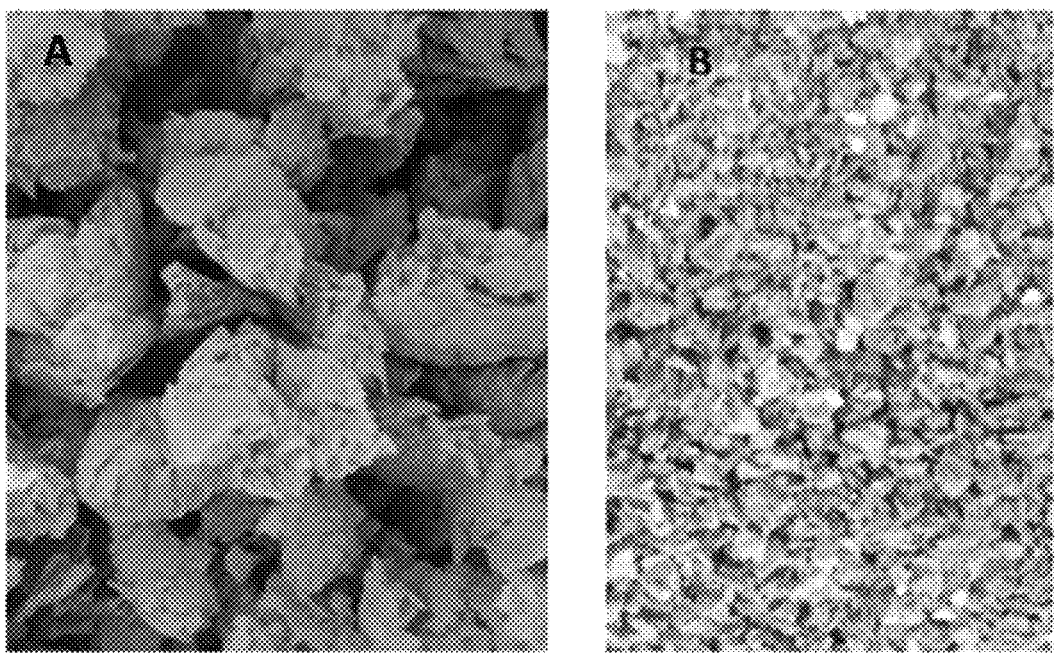
FIG. 6 shows the masterbatch of 50/50 PE/cellulose pulp after incorporation in the mixing chamber (A) and after being milled (B).

FIG. 6 shows the masterbatch of PE/fiber just after being processed in the mixing chamber and after being milled.

2.2 Composites Processing using Masterbatch

Initially, polyolefin composites and masterbatches of PP and PE at 90/10 weight ratios were manufactured. For this process, two gravimetric feeders were used. Firstly, the addition of the masterbatch in the third addition zone was tested; however, even after the hopper neck being cooled with water, the masterbatch melted in the hopper mouth, thus hindering its feeding into the extruder.

To overcome this problem the solution was adding the polymer and the masterbatch into the first addition hopper, controlling the mass ratio through the feeder speed to obtain a 90/10 thermoplastic composite. This method resulted in an addition process completely stable and an even extrusion throughout the process. The addition rate of the gravimetric feeders remained constant throughout the process. The fiber type used in the masterbatch did not alter the processing parameters, of both feeding and dosage. This process also allows a greater production in Kg/h when compared to other processes tested. After the extrusion process started and the extruded started to be shredded, the process remained constant until all the raw material added in the hoppers has been processed.

In order to obtain the 70/30 composite, the feeder rates were set at 2 Kg/h for feeding pure PP and 3 Kg/h for feeding the PP+fiber masterbatch. At the rate of 3 Kg/h, and due to the masterbatch density, the feeder was not able to maintain the feed rate constant. As a manner to circumvent this problem, the dosing ratio was reduced by half. The flow of material leaving the array was not constant, as in the 90/10 composite. The spaghetti broke several times and the extruded surface was rough. As a manner to circumvent this defect, the screw speed could have been adjusted to higher values. However, as previously mentioned, with the turbulent flow that the material leaves the extruder, for this composition, the processing speed should be low, that is, lower than 120 rpm.

For the PE composites, the behavior during the extrusion process was similar to the PP composites. For the 70/30 composite, the material flow at the array exit was constant, and the process, once the pelletization has started, was continuous until all raw material has been consumed.

The best dosage and processing conditions for PP and -PE are detailed below.

90/10 PP
Feeder 1 rate (polymer): 2.4 Kg/h
Feeder 2 rate (masterbatch): 0.6 Kg/h
Screw speed: 250 rpm
Shredder speed: 13 rpm/8.5 rpm ( handle speed and cutting speed)

70/30 PP
Feeder 1 rate (polymer): 1 Kg/h
Feeder 2 rate (masterbatch): 1.5 Kg/h
Screw speed: 120 rpm
Shredder speed: 13 rpm/8. 5rpm (handle speed and cutting speed)

90/10 PE
Feeder 1 rate (polymer): 2.4 Kg/h
Feeder 2 rate (masterbatch): 0.6 Kg/h
Screw speed: 200 rpm
Shredder speed: 13 rpm/8.5rpm (handle speed and cutting speed)

70/30-PE
Feeder 1 rate (polymer): 1.5 Kg/h
Feeder 2 rate (masterbatch): 2.25 Kg/h
Screw speed: 140 rpm Shredder speed: 13 rpm/8.5rpm (handle speed and cutting speed)

Figure 7:
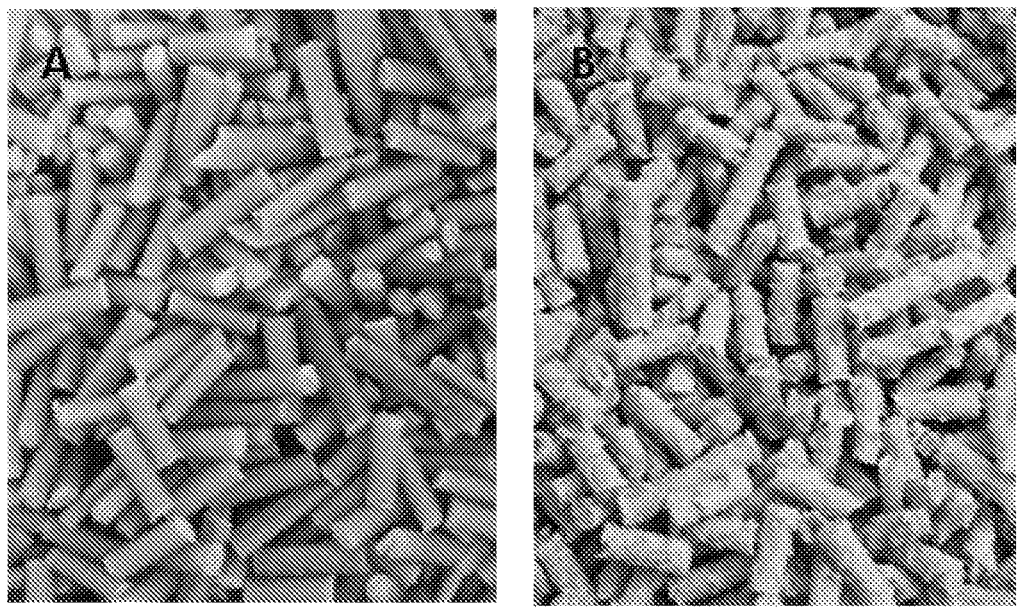
FIG. 7 shows PP/cellulose pulp composites: 90/10 (A) and 70/30 (B).
Figure 8:
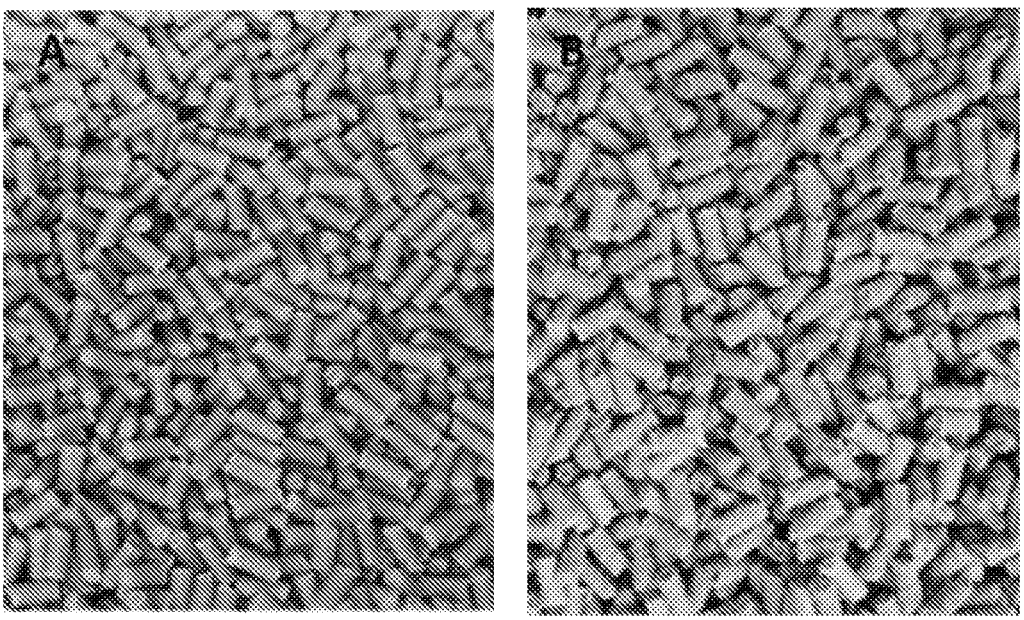
FIG. 8 illustrates PE/cellulose pulp composites: 90/10(A) and 70/30 (B).

FIGS. 7 and 8 show the composites obtained by processing with the masterbatch.

Thus, although only some embodiments of the present invention have been shown, it will be understood that several omissions, substitutions and changes can be made by a person skilled in the art, without departing from the spirit and scope of this invention. The embodiments described should be considered in all respects only as illustrative and not in a restrictive manner.

It is expressly provided that all combinations of the elements that perform the same function substantially the same way to achieve the same results are within the scope of the invention. Substitution of elements in an embodiment described to another are also fully comprised and contemplated.

It should be also understood that the drawings are not necessarily in scale, and are only conceptual in nature. The intention is, therefore, to be limited, as indicated by the scope of the attached claims.

Figure 9:
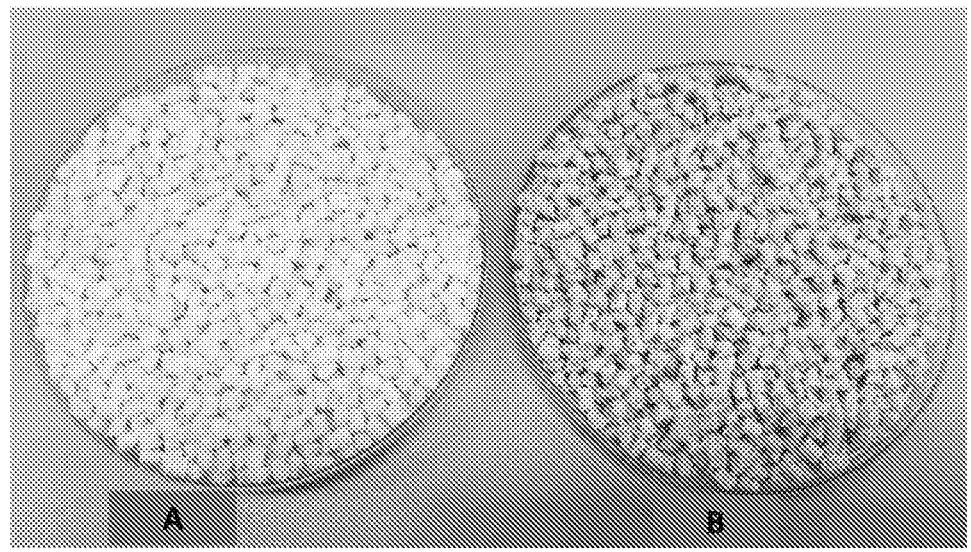
FIG. 9 shows PP/cellulose pulp enriched with microfibrillated cellulose composite pellets: 90/10 (A); and 70/30 (B).

Equivalent procedures can be adopted for additive cellulose pulp. An example of additive cellulose pulp is cellulose pulp enriched with microfibrillated cellulose. FIG. 9 show the composites of cellulose pulp enriched with microfibrillated cellulose obtained by processing with the masterbatch.

Figure 10:
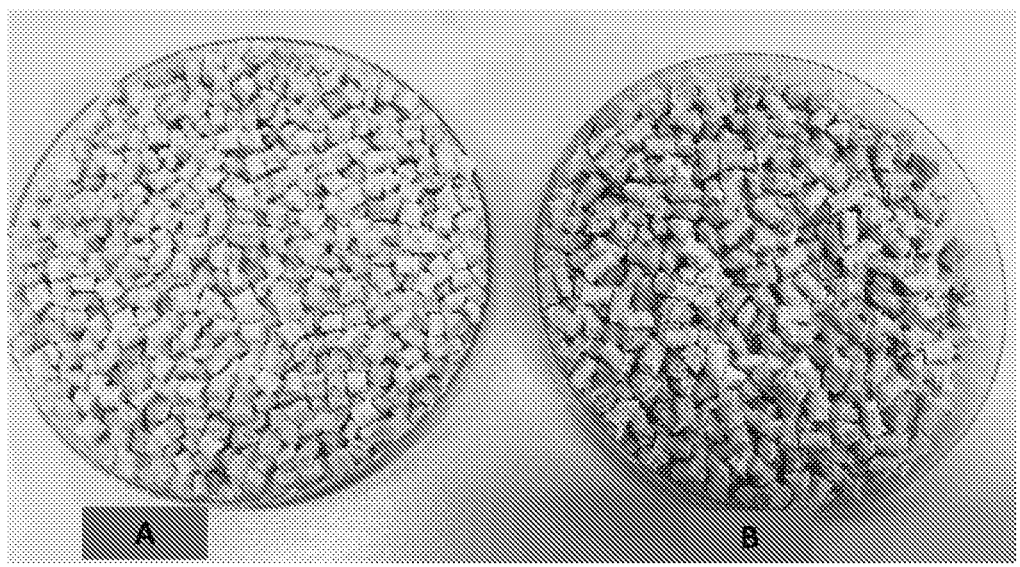
FIG. 10 shows PP/-unbleached cellulose pulp composites pellets: 90/10 (A); and 70/30 (B).

Another example of cellulose that can be used to obtain composites using the described procedure is the unbleached cellulose pulp. FIG. 10 show the composites of unbleached cellulose pulp obtained by processing with the masterbatch.

Example 3—Characterization 3.1—Heat Deflection Temperature (HDT)

Table 3 presents the results of the evaluation of heat deflection temperature. The results show an increase in HDT by insertion of cellulose pulp in the composites. The greatest increase in heat deflection temperature was observed for the PP/Unbleached cellulose pulp 70/30 and PP/cellulose pulp enriched with microfibrillated cellulose 70/30 composites. This increase can be related to the fact that the cellulose fibres, in greater ratio, may lead to greater number of interlacing between the molecules, thus restricting the molecular mobility.

TABLE 3

| Heat deflection temperature (HDT) | |
|---|---|
| Sample | HDT (° C.) |
| PP- | 54.63 |
| PP/cellulose pulp 90/10 | 59.10 |
| PP/cellulose pulp 70/30 | 59.20 |
| PP/unbleached cellulose pulp 90/10 | 61.00 |
| PP/unbleached cellulose pulp 70/30 | 90.80 |
| PP/cellulose pulp enriched with microfibrillated cellulose 90/10 | 59.10 |
| PP/cellulose pulp enriched with microfibrillated cellulose 70/30 | 84.70 |

3.2 Flow Index (Melt Flow Index)

A flow index analysis was performed to assess the processability of materials according to ASTM D1238—Procedure A, the temperature of 230 éC, 10 min assay and 2.16 kg of applied load. The assay was carried out on a DSM plastomer. The results are shown in table 4.

TABLE 4

| Flow index | |
|---|---|
| Sample | MFI (g/10 min) |
| PP- | 40.00 |
| PP/cellulose pulp 90/10 | 27.79 |
| PP/cellulose pulp 70/30 | 6.77 |
| PP/unbleached cellulose pulp 90/10 | 16.33 |
| PP/unbleached cellulose pulp 70/30 | 2.34 |
| PP/cellulose pulp enriched with microfibrillated cellulose 90/10 | 13.93 |
| PP/cellulose pulp enriched with microfibrillated cellulose 70/30 | 2.60 |

The results of the MFI assays show that the insertion of pulp and the increased pulp content decrease the flow index of materials which, consequently, changes the material processing conditions in relation to the pure polymers. This need for change of conditions has been confirmed during the processing of materials for injection of specimens.

3.3 Morphological Analysis

The morphology of composites was assessed using a Jeol scanning electron microscope (SEM), model JSM6010LA, in image acquisition mode by secondary electrons and 100× magnification.

Figure 11:
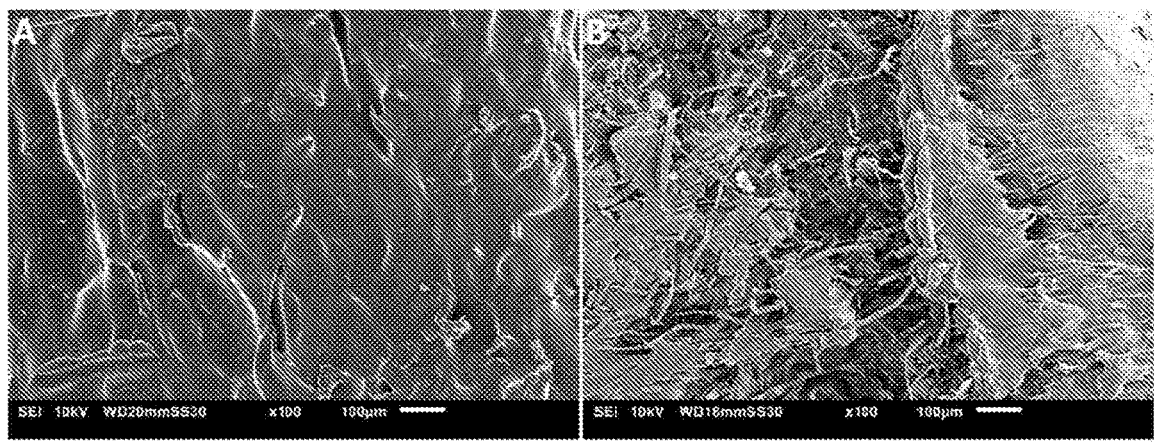
FIG. 11 shows MEV of PP/unbleached cellulose pulp composite (90/10): (A) sample surface and (B) region of fracture perpendicular to the material flow.
Figure 12:
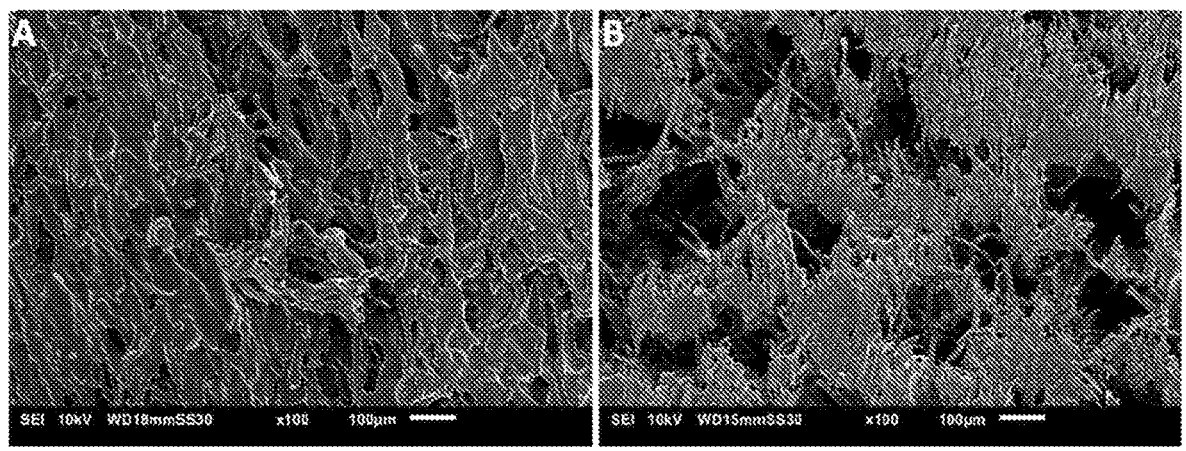
FIG. 12 illustrates MEV of PP/unbleached cellulose pulp composite (70/30): (A) sample surface and (B) region of fracture perpendicular to the material flow.
Figure 13:
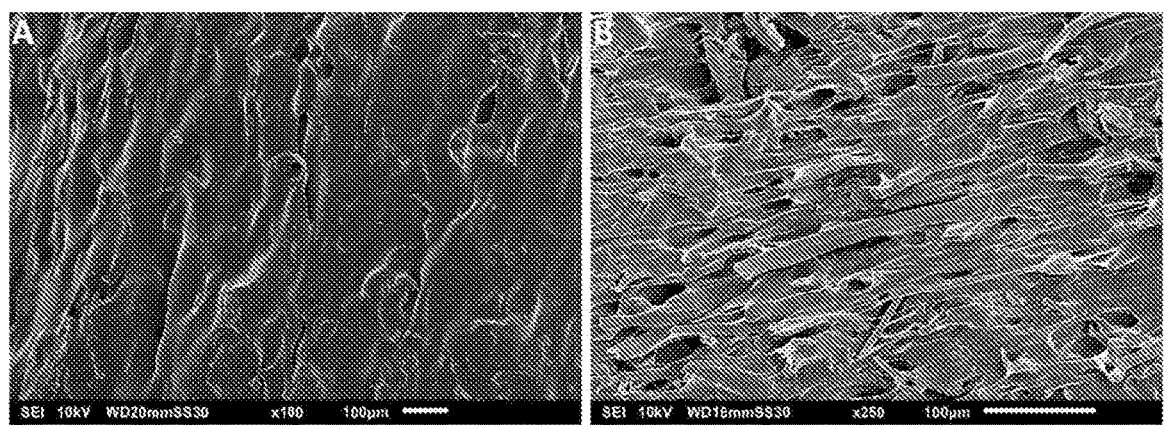
FIG. 13 illustrates MEV of PP/cellulose pulp enriched with microfibrillated cellulose composite (90/10): (A) sample surface and (B) region of fracture perpendicular to the material flow.
Figure 14:
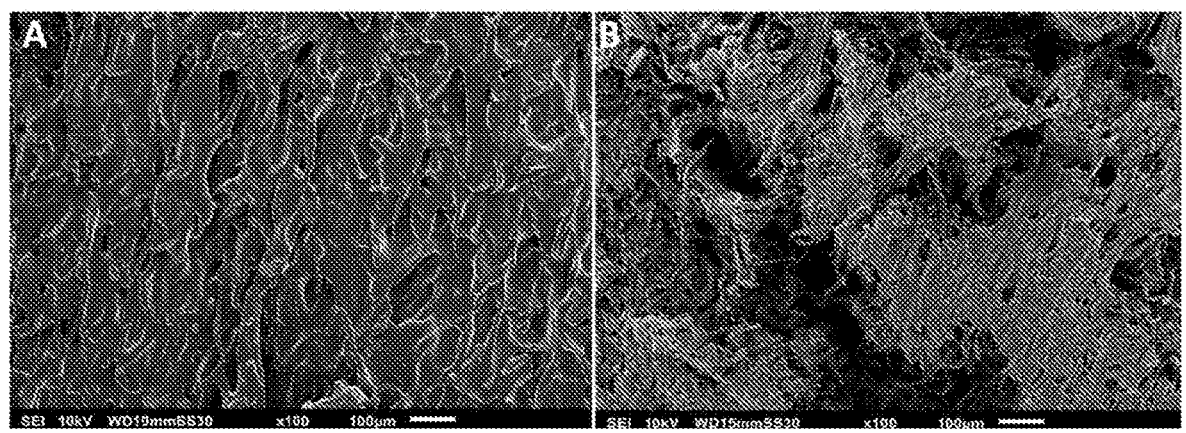
FIG. 14 illustrates MEV of PP/cellulose pulp enriched with microfibrillated cellulose composite (70/30): (A) sample surface and (B) region of fracture perpendicular to the material flow.

FIGS. 11 and 12 show the morphology of composites PP/unbleached cellulose pulp (90/10) and PP/unbleached cellulose pulp (70/30), respectively; and FIGS. 13 and 14, of composites PP/cellulose pulp enriched with microfibrillated cellulose (90/10) and PP/cellulose pulp enriched with microfibrillated cellulose (70/30), respectively. The images show the presence of scattered fibers in composites, and it is not possible to identify the separate phases of the pulp and the polymer matrix.

3.4 Water Absorption

The water absorption tests were conducted according to ASTM D570 standard. The specimens were dry weighed after 24 h and 168 h of of immersion. The calculated results are shown in table 5.

TABLE 5

Water absorption

| Sample | Water absorption after 24 h (%) | Water absorption after 168 h (%) |
|---|---|---|
| PP- | 0.47 | 0.20 |
| PP/unbleached cellulose pulp 90/10 | 0.14 | 0.27 |
| PP/unbleached cellulose pulp 70/30 | 0.67 | 0.78 |
| PP/cellulose pulp enriched with microfibrillated cellulose 90/10 | 0.14 | 0.43 |
| PP/cellulose pulp enriched with microfibrillated cellulose 70/30 | 0.53 | 0.72 |

After 24 hours of immersion, the samples already show absorption and, after 168 h, the absorption is even greater. It can be also noted that the increase in pulp content is also responsible for the increase in water absorption by the composites, and this behavior is expected since the pulp is a more hydrophilic material than the thermoplastic used as matrix. Polypropylene is a non-polar hydrocarbon, while cellulosic pulp presents polar hydroxyl groups that can interact with water, by hydrogen bonding. The composite PP/unbleached cellulose pulp 90/10 showed the better performance related to the water absorption.

3.5 Mechanical Assays

The tensile assays were carried out according to standard ISO 527-2 using an Instron universal machine for mechanical tests with load cell of 5 kN, a micro-extensometer and spacing speed of 500 mimmin$^{-1}$. The results are shown in table 6.

TABLE 6

Tensile strength of composites

Tensile strength

| Sample | Modulus (MPa) | Tension at outflow (MPa) | Elongation at stretching (%) | Break strain at break (MPa) | Stretching at break, % |
|---|---|---|---|---|---|
| PP | 2048 | 39 | — | 36 | — |
| PP/cellulose pulp 90/10 | 2145 | 36 | — | 35 | — |
| PP/cellulose pulp 70/30 | 3997 | 35 | — | 40 | 0.2 |
| PP/unbleached cellulose pulp 90/10 | 2303 | 31.25 | 6.64 | 30.63 | 10.36 |
| PP/unbleached cellulose pulp 70/30 | 2114 | 36.01 | 6.58 | 35.61 | 7.24 |
| PP/cellulose pulp enriched with microfibrillated cellulose 90/10 | 1632 | 29.55 | 6.66 | 27.55 | 17.17 |
| PP/cellulose pulp enriched with microfibrillated cellulose 70/30 | 2829 | 34.93 | 5.34 | 34.50 | 5.87 |

As can be seen in table 6, the values of elastic modulus increased with the addition of cellulose fibres, with exception of PP/cellulose pulp enriched with microfibrillated cellulose 90/10 composite, which presented a module less than pure PP. The increase in the ratio of fiber used in the composite leads to a proportional increase in the modulus of composites. Composite PP/cellulose pulp 70/30 was the composite that presented the greatest absolute value between the composites prepared.

The flexural tests (table 7) were carried out according to ISO standard 178:2010, method A, in an Emic model DL2000 universal machine for mechanical tests with a Trd 22 load cell and Trd 15 extensometer.

TABLE 7

Flexural tests

Flexural strength

| Sample | Modulus (Mpa) | Maximum flexural stress (MPa) |
|---|---|---|
| PP | 1091 | 37.50 |
| PP/cellulose pulp 90/10 | 1671 | 44.2 |
| PP/cellulose pulp 70/30 | 3204 | 62.7 |
| PP/unbleached cellulose pulp 90/10 | 1478 | 33.62 |
| PP/unbleached cellulose pulp 70/30 | 2930 | 53.88 |
| PP/cellulose pulp enriched with microfibrillated cellulose 90/10 | 1504 | 39.32 |
| PP/cellulose pulp enriched with microfibrillated cellulose 70/30 | 2562 | 49.18 |

As it can be noted in the results shown in table 7, the composites prepared with the addition of cellulosic pulp showed superior results to the pure PP, proving that the fibers act as strengthening agents in the polymer matrix. The increase in the fibers ratio leads to a proportional increase of the module and the maximum bending stress. The compound PP/cellulose pulp 70/30 also presented the highest values in the flexural analysis.

The impact strength tests were carried out according to ISO 180 standard, method A, using a CEAST impact machine with Notch Vs. Hammer carver used in the assay with 1 J capacity, speed of 3.460 m/s. Table 8 shows the impact tests results.

TABLE 8

Impact strength

| Sample | Impact strength (kJ/m$^2$) |
|---|---|
| PP | 3.07 (ĕ 0.09) |
| PP/cellulose pulp 90/10 | 1.67 (ĕ 0.65) |
| PP/cellulose pulp 70/30 | 3.45 (ĕ 0.81) |
| PP/unbleached cellulose pulp 90/10 | 2.69 (ĕ 0.20) |

TABLE 8-continued

Impact strength

| Sample | Impact strength (kJ/m$^2$) |
|---|---|
| PP/unbleached cellulose pulp 70/30 | 4.01 (ĕ 0.15) |
| PP/cellulose pulp enriched with microfibrillated cellulose 90/10 | 2.64 (ĕ 0.07) |
| PP/cellulose pulp enriched with microfibrillated cellulose 70/30 | 3.16 (ĕ 0.22) |

The results show that the cellulose pulps effectively act as reinforcements, since the impact resistance significantly increases with the pulp insertion. On the other hand, due to the heterogeneity of reinforced material compared to the material without reinforcement, a higher standard deviation in these samples is noted. The increase of fiber ratio leads to increased impact resistance of the composites. The PP/unbleached cellulose pulp 70/30 composite is the one that presents the highest impact resistance between the prepared composites.

3.8. Visual Analysis of Specimens

Figure 15:
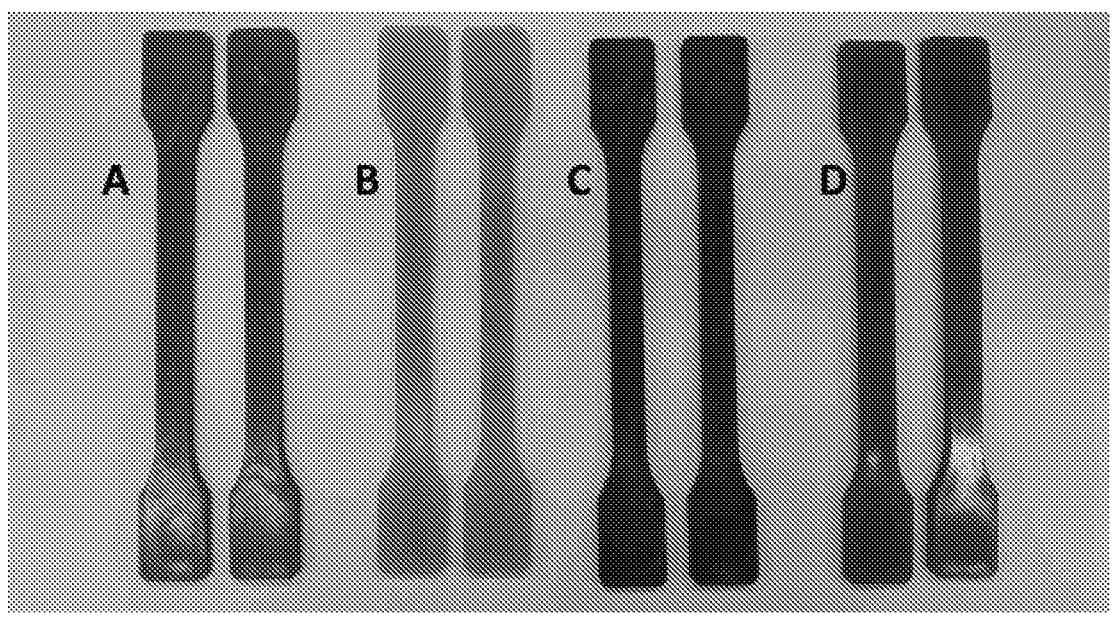
FIG. 15 shows composite specimens: (A) PP/cellulose pulp enriched with microfibrillated cellulose 70/30, (B) PP/cellulose pulp enriched with microfibrillated cellulose 90/10, (C) PP/unbleached cellulose pulp 70/30 and (D) PP/unbleached cellulose pulp 90/10.

FIG. 15 shows photos of the specimens prepared for the characterization of composites. It is possible to observe the excellent visual homogeneity of these composites.

The invention claimed is:

1. Process for obtaining thermoplastic composite pellets reinforced with cellulose pulp comprising the steps of:
   a) cellulose pulp milling carried out in a knife mill consisting of a tube in which the cellulose pulp is milled by an axle with knives comprised within said tube;
   b) preparing a masterbatch consisting of the mixture of the milled cellulose pulp of step a) and a thermoplastic polymer in a mixing chamber at a temperature ranging from about 90° C. to about 300° C. by:
      b.1) adding and melting the thermoplastic polymer in the mixing chamber; and
      b.2) after complete melting of the thermoplastic polymer, adding the milled cellulose pulp of step a) into the mixing chamber;
   wherein the masterbatch comprises a thermoplastic polymer and the milled cellulose pulp of step a) at a ratio of 10/90 to 90/10;
   c) milling the masterbatch of step b) into the knife mill;
   d) drying the milled masterbatch produced in step c) for 1 to 48 hours at 30° C. to 100° C.; and
   e) obtaining the thermoplastic composite pellets reinforced with cellulose pulp by means of the extrusion of the dried masterbatch of step e) and an additional thermoplastic polymer through a twin screw extruder using two gravimetric feeders, one for each product, with speeds ranging from 10 to 400 rpm and temperatures from about 90° C. to about 300° C.

2. Process, according to claim 1, wherein the mixing chamber of step b) is coupled to a torque rheometer.

3. Process, according to claim 2, wherein in step b.2), the milled cellulose pulp is added in steps into the mixing chamber in line with the torque variation of the torque rheometer in order to achieve clarity of dispersion and homogeneity of the masterbatch.

4. Process, according to claim 1, wherein step b) further includes the addition of at least one compatibilizer for preparing the masterbatch, and wherein said at least one compatibilizer is selected from the group consisting of maleic anhydride and additives.

5. Process, according to claim 4, wherein the at least one compatibilizer is lignin or nanocellulose.

6. Process, according to claim 1, further including addition of at least one pigment for preparing the masterbatch.

7. Process, according to claim 1, further comprising prior to step b) a step of separately drying the milled cellulose pulp of step a) and the thermoplastic polymer for 1 to 48 hours at 30° C. to 100° C.

\* \* \* \* \*